(12) United States Patent
Grechanik

(10) Patent No.: US 7,865,454 B2
(45) Date of Patent: Jan. 4, 2011

(54) FEATURE CONFIGURATION ANALYSIS TOOL

(75) Inventor: Mark Grechanik, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 753 days.

(21) Appl. No.: 11/824,018

(22) Filed: Jun. 29, 2007

(65) Prior Publication Data

US 2009/0006452 A1    Jan. 1, 2009

(51) Int. Cl.
*G06N 5/00* (2006.01)
(52) U.S. Cl. .......................... 706/45; 706/13
(58) Field of Classification Search .............. 706/13, 706/45
See application file for complete search history.

(56) References Cited

U.S. PATENT DOCUMENTS 5,867,397 A * 2/1999 Koza et al. ............. 703/14
6,360,191 B1 * 3/2002 Koza et al. ............. 703/6

OTHER PUBLICATIONS

Eén et al., "An Extensible SAT-solver," Chalmers University of Technology, Sweden, pp. 1-23, Year:2004.

* cited by examiner

*Primary Examiner*—Wilbert L Starks, Jr.
(74) *Attorney, Agent, or Firm*—Fish & Richardson P.C.

(57) ABSTRACT

A feature configuration analysis tool greatly reduces time, cost, and other resource expenditures associated with identifying permissible feature configurations for a product line so that vendors can offer consumers highly customizable products. Accordingly, the vendor may offer the consumer an extensive selection of features for a product, receive from the customer a customized selection of the features, and implement those features for the customer. A vendor may embed the feature configuration analysis tool into a user interface that enables consumers to consider feature configurations prior to purchasing a product. The feature configuration analysis tool provides a lightweight and efficient approach to rapidly determine permissible feature configurations for a product line, and verify the validity of a user requested combination of features.

17 Claims, 10 Drawing Sheets

FEATURE CONFIGURATION ANALYSIS TOOL

BACKGROUND OF THE INVENTION

1. Technical Field

This disclosure concerns analyzing the features of a product line and determining permissible feature configurations.

2. Background Information

A feature configuration analysis tool allows vendors to offer customizable products to consumers. For example, many software vendors base the price of an application on the features delivered, and consider a feature as an end-user-visible characteristic of a system describing a unit of functionality. A vendor selling an email client program may charge more when the program includes a cryptographic feature. Software vendors prefer to ship applications with entire sets of features to customers and it economically infeasible to ship a different version of an application every time a customer wants a new configuration. Customers switch between different configurations of an application (e.g., sets of features) by employing software vendor provided configuration codes during installation and upgrade of an application. The configuration codes activate the ordered features, and/or alternatively, deactivate features.

The potential market for a product line (e.g., an application) expands when features (e.g., services) can be easily added and removed from a configuration (e.g., application), because customers can order configurations that fit their budgets. Configurations may be produced based on the system requirements needed to support the complexity of a configuration, cost sensitivity of the consumer, and the amount of revenue generated by a configuration.

Determining the permissibility of a requested feature configuration (e.g., compatibility of features) may be easy when a product or a service (e.g., model-T Ford automobile) includes a small number of features. However, large-scale product lines include hundreds of features, transforms the technical challenge into a nondeterministic polynomial-time hard (NP-hard) type of problem. When a developer uses propositional logic formulae (PLF) to express constraints on a product line, the developer may consider using a SAT solver to analyze possible solutions until the SAT solver identifies a solution that satisfies the constraints and includes the desired features. Even using the best SAT solvers may require hours to verify the permissibility of a feature configuration, because the heuristics that SAT solvers use do not guarantee quick and complete results. Commercial-strength large-scale software systems find delays in the decision making process unacceptable, especially when consumers use such systems to complete on-line purchases. For example, consumers often evaluate options and prices before making a decision to order a particular configuration. Consumers often have a key set of features in mind when buying any product or service (e.g., computer or a car). For example, a computer retailer web site may offer a wide variety of features that consumers may choose from to include in the configuration of a computer. Even so, some features maybe incompatible with the others. When a consumer selects incompatible features a message appears to inform the customer regarding the incorrect selection (e.g., a particular video card may be incompatible with a particular monitor).

In one implementation, a feature configuration tool may be used by a developer to create dynamically reconfigurable applications (DRAs). When creating applications, developers concentrate on designing and implementing core functionality and delivering an evaluation version of an application with a finite set of features to customers. Customers evaluate the application and identify a desired set of features. Because developers find it difficult to anticipate the features that a customer will want prior to the evaluation may be one reason that the development process proceeds in this manner. Accordingly, developers often choose to transform applications into DRAs after a particular period of time has lapsed following application deployment. Even so, developers find it challenging to design and implement DRAs because of the complexity involved in building DRAs. Developers currently build DRAs employing a tedious, intrusive, manual and error-prone method of searching for uses of variables that represent reconfigurable features in application logic, and replacing the variables with fragments of code that handle the deactivated, and customized states of the replaced variables.

Transforming applications into DRAs using current methods requires developers to identify application features in the logic, and logical collections of application variables (i.e., objects) and types (e.g., methods, classes, and interfaces) that represent the features. Modifying existing logic to add feature deactivation and customized functionality can be viewed as unplugging variables corresponding to features from a tree that represents the application and replacing the unplugged variables with fragments of code to handle activation, deactivation, or modification of functionality involving those variables that match the unplugged variables. Activating, deactivating and customizing alternative functionality for features requires developers to analyze how states of DRAs change (e.g., the properties of DRAs) and influence the properties of an application. The complexity of DRAs makes it difficult to verify the properties of DRAs. Organizations find current methods of transforming applications into DRAs expensive, difficult to effectively verify the correctness of the DRAs produced, and often lead to DRAs with bugs (e.g., application run-time errors).

Highly specialized solutions have evolved that employ frameworks that provide basic dynamic reconfiguration services for various types of applications, including: component-based, distributed, grid, and high-performance applications. Few of the specialized solutions verify the DRAs produced by the frameworks because of the complexity of the frameworks. Among the frameworks, conceptual frameworks describe architecture models for dynamic reconfiguration (e.g., Extensible Coordination Framework (ECF)) that enable developers to design DRAs as graphs and compile the graphs and extension modules into a resulting executable of a DRA. Mastering such frameworks requires a steep learning curve for developers, making it difficult to maintain and evolve the DRAs resulting from using such frameworks.

Developers may also use solutions that employ special system services provided by operating systems and different execution platforms to add and remove applications features. Such solutions inherently include unavoidable performance penalties because adding reconfiguration enabled special services requires changes to the kernels of underlying operating systems, component platforms, and virtual machines. Developers find such solutions challenging to implement and analyze for consistency with the legacy application properties (e.g., run-time behaviour). Most of the formal research directed to methods for developing DRAs focus on distributed systems that employ different formalisms to represent computations at a low level, but often the computations do not scale to large DRAs.

The extraordinary technical challenges associated with determining permissible feature configurations are evident in that all of the previously mentioned techniques of analyzing the permissibility of a feature configuration perform poorly in comparison to the feature configuration tool.

A need has long existed for a system and method that addresses the feature configuration analysis problems noted above, and rapidly verifies the permissibility of a feature configuration.

SUMMARY

The feature configuration analysis tool determines the permissibility of a feature configuration for a product line. For example, a developer may use a feature configuration analysis tool (e.g., feature configuration (FC) analyzer) to facilitate the creation of dynamically reconfigurable applications (DRAs) that include services (e.g., features) whose interconnections can be changed at run-time. Developers consider implementing reconfiguration difficult because implementing reconfiguration involves changing the structure of system's components and their interconnections. Developers find it especially difficult to transform monolithic applications that were not designed reconfigurable. Employing a feature configuration analyzer, Dynamically Reconfigurable Applications Mutable Architecture (DRAMA) may provide a lightweight and practical approach to making monolithic applications dynamically reconfigurable. DRAMA provides capabilities for building DRAs that users may switch between configurations by selecting the services (e.g., features) desired. In one implementation, the FC analyzer may verify the consistency of a chosen configuration (e.g., run-time behaviour) with a given application architecture.

The FC analyzer may be used with DRAMA to transform legacy applications written in any language (e.g., Java, C, and C++) into DRAs, and verifies the consistency of properties of DRAs with the legacy application. DRAMA receives application logic (e.g., source code and binary code) and a feature graph (FG) that represents a hierarchical decomposition of application features to produce a DRA. A developer specifies one-to-many mappings between features in the feature graph and types and variables in the application. The developer maps each type and variable in the application to a feature in the feature graph. DRAMA may assist developers to locate where in the logic different features attach to each other (i.e., variation points) based on the mappings. In other words, DRAMA may assist a developer to analyze expressions that establish relationships between variables that mapped to different features. DRAMA may also assist a developer to generate fragments of logic (e.g., interceptors) that imitate the functionality of the features as though disabled. The interceptors may not be invoked when the feature remains active, or may bypass calls to objects that implement a particular feature of a deactivated feature, or the inceptor may invoke the code supplied by a developer which replaces the functionality of the deactivated feature. The developer may write replacement code (e.g., alternative enhanced or limiting functionality) into an interceptor separate from the application code, without requiring any changes to the legacy application logic.

The FC analyzer may be used in the context of purchasing non-software based products and services. For example, customers often evaluate options and prices before making a decision to order a particular configuration. Customers often have a key set of features in mind when buying any product or service (e.g., computer or a car). For example, a computer retailer web site may offer a wide variety of features that a customer may choose from to include in the configuration of a computer. Even so, some features may be incompatible with the others. When a consumer selects incompatible features a message appears to inform the customer regarding the incorrect selection (e.g., a particular video card maybe incompatible with a particular monitor). The FC analyzer may present a user with a determination that quickly identifies incompatibilities and avoids unnecessary attempts to deploy or build impermissible feature configurations. The FC analyzer may also provide suggested feature configurations to a consumer based on requested feature configurations considered impermissible.

In one implementation, DRAMA may use the FC analyzer to ensure the correctness of various properties of DRAs, and alerts developers when a feature graph incorrectly models the code and when the DRA implementation does not match a given FG. DRAMA verifies the consistency of a features configuration with respect to the FG, and confirms whether a permissible features configuration exists that satisfies the FG. As an additional result, DRAMA determines whether two or more equivalent FGs exist for a configuration. DRAMA also determines whether a configuration with two particular features may coexist.

DRAMA produces a FG that models an application. FGs include features connected by variation points. A node on a FG represents a variation point to which features attach. Where features connect to a particular variation point the application variables that map to the features may also connect via a relationship. For example, expressions that use feature-mapped-variables and containments of variables representing one feature within types that map to the other feature may define the relationships. Another example, where an object maps to one feature and a method of a class that maps to some other feature declares the object, the containment defines a variation point between the two features. Where a developer selects an incorrect FG, the connections between features represented in the FG may not match the relationships between the corresponding variables in the application and vice versa, and DRAMA alerts the developer to the inconsistency.

Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views.

DETAILED DESCRIPTION

Figure 1:
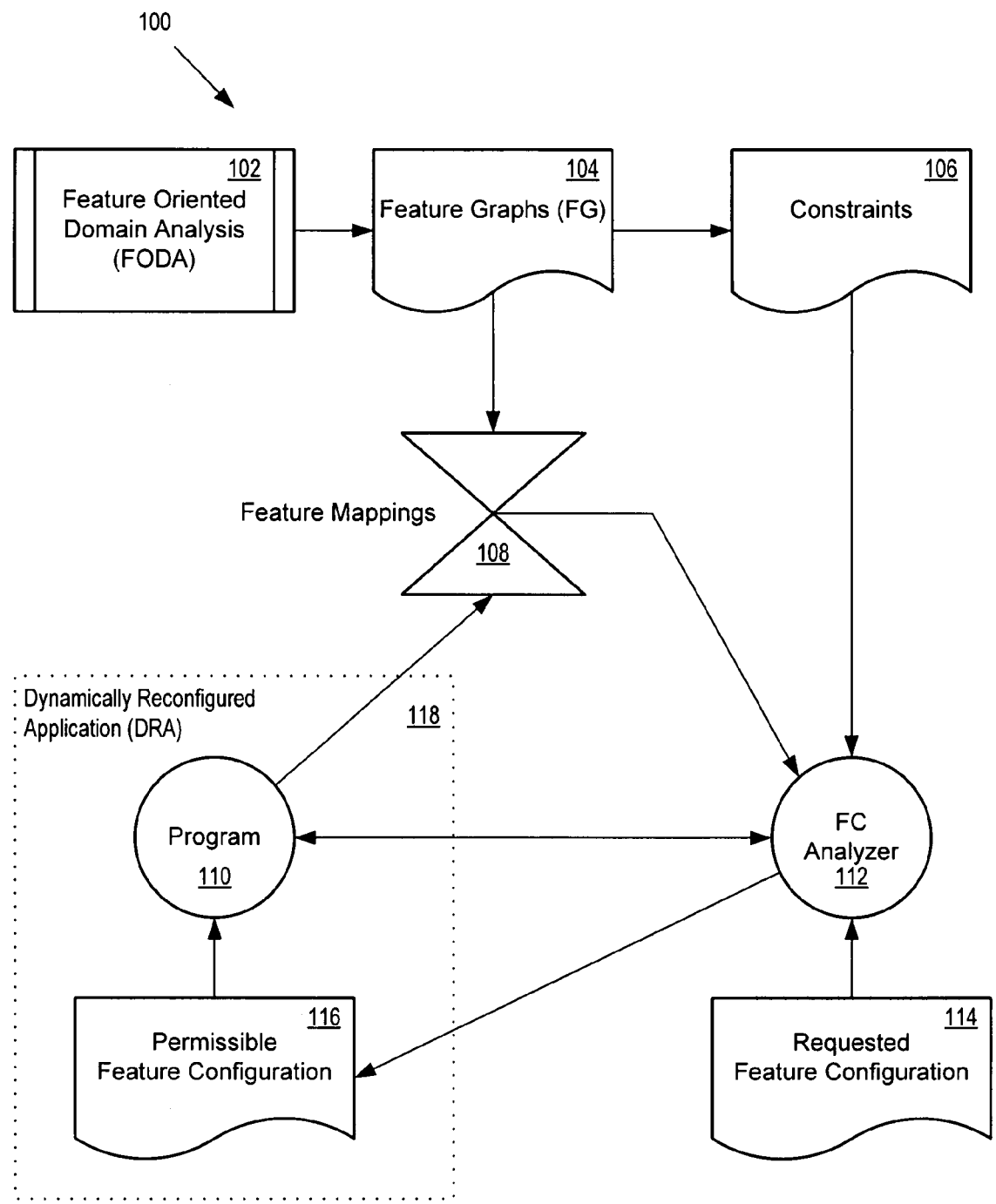
FIG. 1 illustrates a dynamically reconfigurable applications mutable architecture (DRAMA).

The FC analyzer identifies permissible feature configurations for a product line so that vendors can offer consumers highly customizable products. The FC analyzer provides vendors the ability to offer consumers an extensive selection of feature configurations for products, accept customized feature configurations from customers, and implement the features for the customer. A vendor may embed the FC analyzer into a user interface that enables consumers to consider feature configurations prior to purchasing a product. The FC analyzer provides an efficient approach to rapidly determine permissible feature configurations for a product line, and verify the validity of a user requested combination of features. Organizations currently spend considerable time and money to determine the permissibility of feature configurations for a product line.

In one implementation, the FC analyzer provides vendors the ability to consider each feature configuration a product of a product-line-architecture (PLA). A product-line-architecture (PLA) possesses all the variations of a set of closely-related products (e.g., applications), and involves modelling commonalties as well as the variability that between products. Similarly, DRA products are built from a common set of services and share a common architecture. For example, a monolithic application represents a family of similar products (e.g., PLA) differentiated by services. Each occurrence of a new configuration of a DRA creates a new instance of a PLA (e.g., a new application, and a new product). DRAMA assists non-developers to quickly and easily adapt existing assets into service oriented architecture (SOA) implementations.

The ability to easily added and removed product line features (e.g., application services and features) allows vendors to expand the potential market of a product line, because customers can order configurations that meet budget requirements. In the context of applications, reconfiguring applications can be done to improve performance, achieve better resource utilization, and address limited computing resources. Employing the FC analyzer, organizations may deploy agile new architectures (e.g., DRAs) to exploit services to solve resource and environmental issues (e.g., processor, memory, current user utilization constraints).

DRAMA provides a novel, generic approach for modularizing services and separates services from the application logic as orthogonal concerns. Service modules include functions used to attach and detach services at predefined points. DRAMA may employ the FC analyzer to analyze Boolean variables that represent services (e.g., features). The value of a Boolean variable representing a service indicates whether to attach or detach the corresponding service. In one implementation, DRAMA may use the FC analyzer to enforce dependencies among services and express service configurations (e.g., feature configurations) using Boolean expressions.

Table 1 shows an example FeatureConfiguration Java rules class where service $f_3$ depends on service $f_2$ which depends on service $f_1$. Method GetService receives a service identifier as a parameter string (e.g., f1, f2, and f3) and returns a value of true when the logical expression (e.g., feature configuration) includes the service. DRAMA may assist developers to define service dependencies using such a Java rules class.

TABLE 1

FeatureConfiguration Java Rules Class

```
class FeatureConfiguration
{
    boolean f1, f2, f3;
    void MainFeatureConfiguration ( )
    {
        if( f1 = GetService("f1") )
        {
            if( f2 = GetService("f2") )
            {
                f3 = GetService("f3");
            }
        }
    }
}
```

Although specific components of DRAMA will be described, methods, systems, and articles of manufacture consistent with Exemplar may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Logic that implements the processing and programs described below may be stored (e.g., as computer executable instructions) on a computer readable medium such as an optical or magnetic disk or other memory. Alternatively or additionally, the logic may be realized in an electromagnetic or optical signal that may be transmitted between entities. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors. Furthermore, the programs, or any portion of the programs, may instead be implemented in hardware.

DRAMA uses logical expressions (e.g., Boolean equation) to describe the services and the dependencies of the services of DRAs. In one implementation, DRAMA employs AspectJ as an implementation mechanism. AspectJ considers join points (e.g., nodes) as well-defined points in the execution of an application that include points at which an object receives a method call and reference points of fields of objects. Edges between nodes (e.g., join points) may represent control flow relations between nodes. AspectJ also employs pointcuts to refer to collections of join points and certain values at the join points. AspectJ uses advice as a method-like construct to define additional behaviour at join points. AspectJ uses aspects as units of modular crosscutting implementation, composed of pointcuts, advice, and ordinary Java member declarations.

DRAMA considers each application service (e.g., feature) an aspect, and the presents of a variable representative of a service in the logical expression invokes an aspect that implements service activation and deactivation. An identifier denotes each service in the logical expression (e.g., found in an equation file). Each aspect registers advice at a predefined join point where a developer inserts the aspect into a DRA to represent a corresponding service. For example, DRAMA may use a special java class called Equations to include Boolean variables with names identical to the identifier of the service defined in the logical expression. Setting a Boolean variable to either true or false may trigger the advice corresponding to the service to activate or deactivate the service. DRAMA employs AspectJ pointcuts to refer to the values of Boolean variables at the join points (e.g., edges) within a DRA. When DRAMA changes a feature configuration (e.g., service), the advice of the corresponding aspect executes to modify the feature configuration real-time. DRAMA may employ a thread (e.g., listener) that monitors for changes to the feature configuration.

FIG. 1 illustrates a dynamically reconfigurable applications mutable architecture (DRAMA) 100. DRAMA 100 may obtain feature oriented domain analysis (FODA) 102 performed by a developer to produce feature graphs (FG) 104. DRAMA 100 may obtain a set of constraints 106 from the feature graphs 104 in the form of propositional logic formulae (PLF) and Context-Free Grammar (CFG), which will be discussed below. DRAMA 100 may assist the developer to produce feature mappings 108 between features defined in the FG 104 and program 110 (e.g., program metadata from a legacy application that includes program types and objects found in a set of related applications). The feature configuration (FC) analyzer 112 may receive the constraints 106, feature mappings 108, program 110 metadata, and requested feature configuration 114 as inputs to analyze and verify the permissibility of the requested feature configuration 114. The FC analyzer 112 may determine the requested feature configuration 114 permissible and update the permissible feature configuration 116 with the requested feature configuration 114 to obtain the dynamically reconfigured application (DRA) 118. However, the FC analyzer 112 may determine the requested feature configuration 114 impermissible and alert a requester of the impermissibility of the requested feature configuration 114, and consequently, not update the permissible feature configuration 116.

Figure 2:
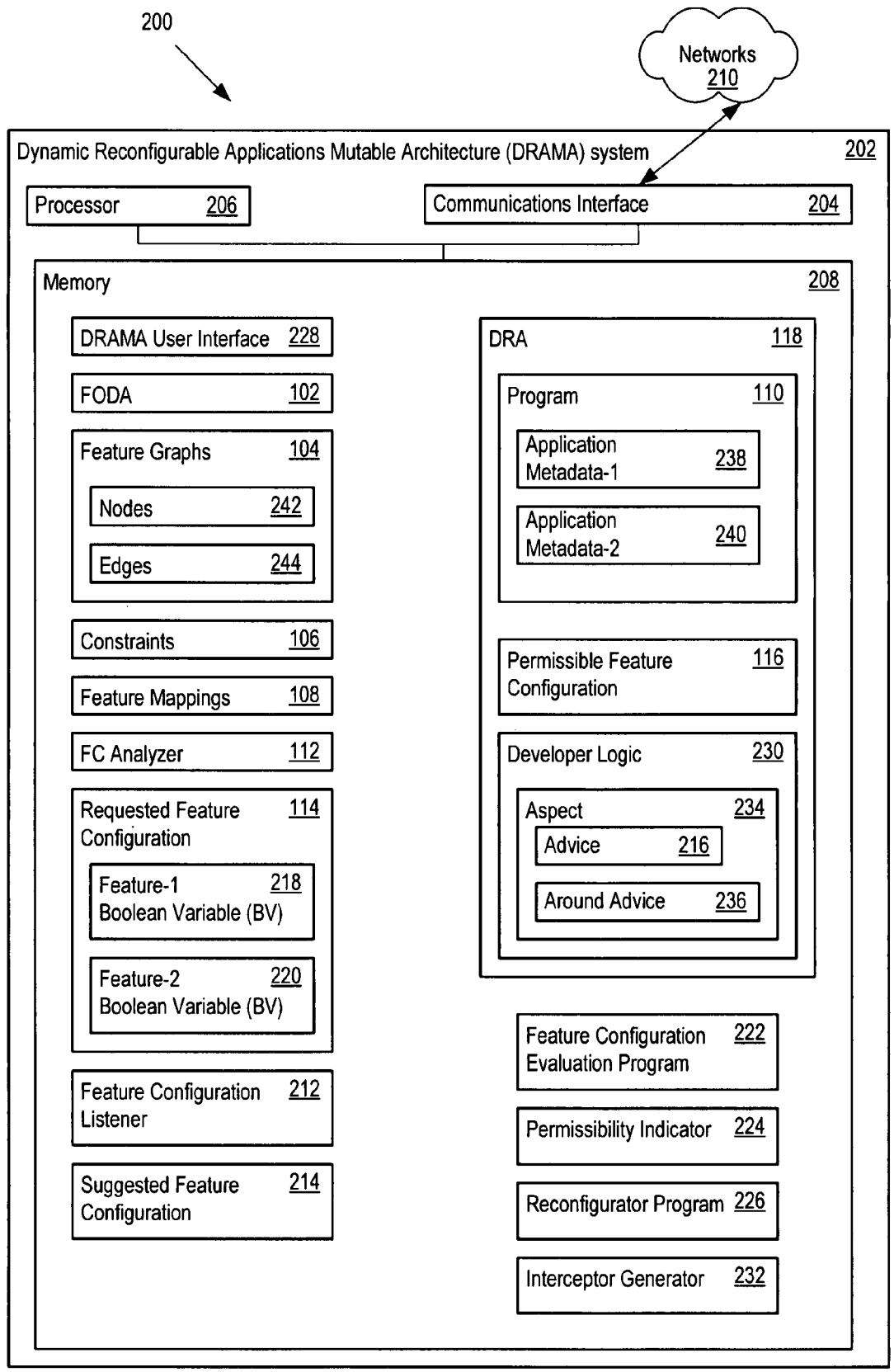
FIG. 2 shows a dynamically reconfigurable applications mutable architecture (DRAMA) configuration.

FIG. 2 shows a dynamically reconfigurable applications mutable architecture (DRAMA) configuration 200. DRAMA configuration 200 may include a DRAMA system 202 that includes a communication interface 204, a processor 206, and memory 208 in communication with networks 210 (e.g., the Internet). DRAMA system 202 may include a feature configuration listener 212 to monitor for requested feature configuration 114. In one implementation, DRAMA configuration 200 may implement the feature configuration listener 212 as a monitoring program that monitors for and detects the requested feature configuration 114. The feature configuration listener 212 may read the requested feature configuration 114 and receive verification from the FC analyzer 112 regarding the permissibility of the requested feature configuration 114. In one implementation, DRAMA configuration 200 may employ a feature configuration evaluation program 222 to evaluate the FG 104 to determine the value of a permissibility indicator 224 for the requested feature configuration 114. The feature configuration evaluation program 222 may also evaluate feature mappings 108 to determine the value of the permissibility indicator 224 for the requested feature configuration 114. DRAMA configuration 200 may permit the DRA 118 to continue to serve user requests using a currently permissible feature configuration 116 until the FC analyzer 112 updates the permissible feature configuration 116 with a requested feature configuration 114 determined to be permissible. The FC analyzer 112 may determine that the requested feature configuration 114 violates a constraint 106 and therefore impermissible, and present a suggested feature configuration 214 as an alternative. In one implementation, FC analyzer 112 may signal the DRA 118 to invoke an advice 216 (e.g., segment of logic) corresponding to a feature (e.g., feature-1 218 and feature-2 220) activation and deactivation, based on the permissible feature configuration 116 updated with a requested feature configuration 114 determined to be permissible. In one implementation, the DRAMA configuration 200 may employ a reconfiguration program (e.g., reconfigurator 226) to update the permissible feature configuration 116 with the requested feature configuration 114 that the feature configuration evaluation program 222 determines to be permissible. The reconfigurator 226 may invoke developer logic (e.g., advice 216) by setting an aspect variable corresponding to a requested feature (e.g., activating and deactivating features), based on the permissibility indicator 224 indicating a permissible status for the requested feature configuration 114, to obtain a DRA 118. The memory 208 may include a DRAMA user interface 228 discussed in detail below.

Table 3 shows a method PermissibleFeatureConfiguration from a VerifyFeatureConfiguration Java class, shown in Table 4, that FC analyzer 112 may call when the FC analyzer 112 updates the permissible feature configuration 116 with a requested feature configuration 114. The FC analyzer 112 may reset Boolean variables representing activated and deactivated features (e.g., feature-1 Boolean variable 218 and feature-2 Boolean variable 220).

TABLE 3

| PermissibleFeatureConfiguration |
| --- |
| featureToolbar |
| featureToolbarNewItem |
| featureToolbarOpenItem |
| featureToolbarSaveItem |
| featureToolbarSaveAsItem |
| featureToolbarPrintItem |
| featureToolbarUndoRedoItem |
| featureToolbarCutItem |
| featureToolbarCopyItem |
| featureToolbarPasteItem |
| featureToolbarFindItem |
| featureToolbarFontItem |
| featureToolbarAboutItem |

TABLE 4

VerifyFeatureConfiguration.java

```
public class VerifyFeatureConfiguration {
    public GenericEditor n = null;
    MonitorFeatureConfiguration mfc = null;
    private boolean set = false;
    private boolean featureToolbar;
    private boolean featureToolbarAboutItem;
    private boolean featureToolbarCopyItem;
    .........
    public VerifyFeatureConfiguration( ) {
        n = new GenericEditor( );
        n.Base( );
        mfc = new MonitorFeatureConfiguration( this );
        mfc.start( );
    }
boolean GetFeature( String q ) {
    for( int i = 0; i < v.size( ); i++ ) {
        String s = (String)v.elementAt( i );
        if( s.compareToIgnoreCase(q) == 0 ) {
            System.out.println( "Feature " + q + " is set to TRUE" );
            return( true );
        }
    }
    System.out.println( "Feature " + q + " is set to FALSE" );
    return( false );
}
public void PermissibleFeatureConfiguration( ) {
```

TABLE 4-continued

VerifyFeatureConfiguration.java

```
if( featureMenuBar = GetFeature("featureMenuBar") ) {
    if( featureFileMenu = GetFeature("featureFileMenu") ){
    .................
```

Table 5 shows an example aspect ToolbarCopyAspect that the FC analyzer 112 may signal the DRA 118 to invoke advice 216 corresponding to the activated and deactivated features. Transforming an application into a dynamically reconfigurable application requires the state of deactivated features to be preserved. DRAMA system 202 preserves the state of a deactivated feature by neutralizing the effect of the logic executed at variation points discussed below. DRAMA system 202 may also allow variation point logic to be bypassed and alternative logic (e.g., developer logic 230) to be executed. DRAMA system 202 may employ an interceptor generator 232 to generate and/or assist a developer to generate developer logic 230. In one implementation, the developer logic 230 may include aspects 234 that include advice 216 and/or around advice 236, discussed below.

TABLE 5

ToolbarCopyAspect.java

```
public aspect ToolbarCopyAspect
{
    JButton GenericEditor.copyButton = null;
    void GenericEditor.CreateToolbarCopyItem( ) {
        toolBar.add( copyButton = new JButton( new ImageIcon(
            this.getClass( ).getResource("images/copy.gif"))));
        copyButton.setToolTipText("Copy");
        copyButton.addActionListener(new ActionListener( ) {
            public void actionPerformed(ActionEvent ae) {
                copY( );
            }
        });
    }
    pointcut menubar(boolean arg) : set(private boolean
    featureToolbarCopyItem)
        && args(arg);
    after(boolean arg) : menubar(arg) {
        VerifyFeatureConfiguration  e  =
    (VerifyFeatureConfiguration) thisJoinPoint.getTarget( );
        if( arg && (e.n.copyButton == null) ) {
            e.n.CreateToolbarCopyItem( );
        }
        else if( arg == false){
            if( e.n.copyButton != null ) {
                e.n.toolBar.remove( e.n.copyButton );
                e.n.copyButton = null; // place alternative developer
                logic here
            }
        }
    }
}
```

Table 6 shows pseudocode for the class Email that implements email functionality. Table 6 illustrates at line 4 that class Email includes a private field 'text' that holds data that the class Email may send to a destination. The private method WriteToDest uses the 'text' field to send the value of the 'text' field to a destination address. The public method Send invokes the method WriteToDest, and accepts 'String' argument that includes data to be emailed. The method Encrypt receives the 'cleartext' message data and calls the method Spellcheck to verify the spelling of the words in the message. Method Encrypt encrypts the message when the Spellcheck verifies that the message includes the correct spelling of the words in the message, otherwise method Encrypt returns the original 'cleartext' message.

TABLE 6 class Email

```
public class Email {
private String text;
public boolean Send( String data ){
    text = Encrypt( data );      //      line 4
    return( WriteToDest( ) );
}
private String Encrypt( String cleartext ) {
    String ciphertext;
    if( Spellcheck(cleartext) ) {   //    line 9
    //encrypt cleartext code here
    //and assign the encrypted data to
    //the ciphertext variable
    }
    else ciphertext = cleartext;
    return( ciphertext );
}
private boolean WriteToDest( ) {
    //send data held by variable text
    //to the destination
    //return true if success, false otherwise
}
private boolean Spellcheck(String data) {
    //spell check data
    //return true if success, false otherwise
}
```

Figure 3:
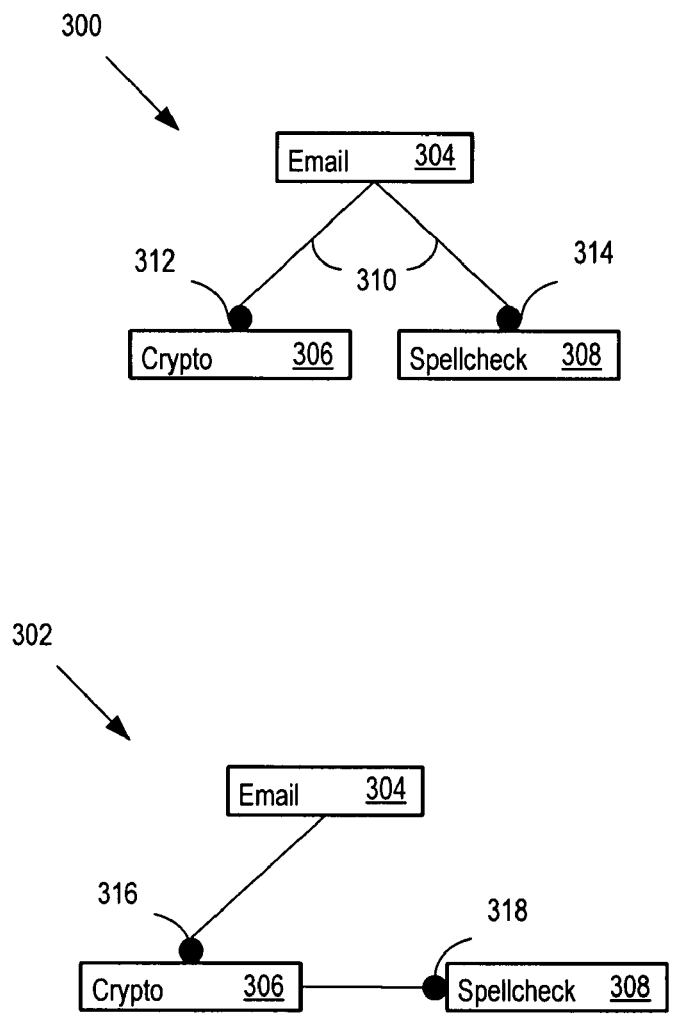
FIG. 3 shows a dynamically reconfigurable applications mutable architecture (DRAMA) user interface.

FIG. 3 shows two feature graphs (FG 300 and FG 302) for an Email 304 feature corresponding to the class Email. Methods Send and WriteToDest map to feature Email 304. Method Encrypt maps to the feature Crypto 306, and method Spellcheck maps to the feature Spellcheck 308. FG 300 and FG 302 illustrate connectors (e.g., edges 310) drawn between two features (e.g., Email 304 and Crypto 306). The solid black circles (e.g., 312, 314, 316, and 318) drawn at one end of the connectors to indicate a child feature (e.g., Crypto 306) that may need to be attached to a parent feature (e.g., Email 304) for the parent feature to work. Connectors may also be drawn with empty circles that indicate that a child feature that may be optionally attached to a parent feature, discussed below.

Analyzing the class Email logic shown in Table 6 and the feature mapping shown in FG 300, a developer can locate variation points. For example, the expression text=Encrypt (data) in line 4 of Table 6 defines a variation point to which features Email 304 and Crypto 306 attach. The method Spellcheck in line 9 defines the location of another variation point, where the method Encrypt invokes the method Spellcheck. The variation point at line 9 reveals that Email 304 and Spellcheck 308 features do not attach to each other, but instead Spellcheck 308 attaches to feature Crypto 306, as shown in FG 302. FG 302 may reveal an improper implementation of features a developer intended to be implemented as shown in FG 300. Alternatively, FG 302 may reflect an intended feature configuration that a developer incorrectly mapped as FG 300. The discrepancy between FG 300 and FG 302 may indicate that a developer should engage in further analysis to determine the proper feature graph. The FC analyzer 112 may automatically detect such discrepancies.

Transforming class Email into a DRA 118, for example, the deactivated Crypto 306 feature may bypass the call to the method Encrypt with the class member variable 'text' set to a value indicating to deactivate the feature. The DRA 118 may also execute alternative developer logic 230 (e.g., logic to customize method Encrypt actions). Alternatively, a feature configuration may deactivate the Crypto 306 feature, causing the Encrypt method to return a predefined constant string as a Crypto 306 feature disabled notice.

A developer may partition classes, interfaces, and methods on the basis of features using DRAMA rules for mapping features to logic. The developer may map types (e.g., interfaces, classes, and methods), variables (e.g., fields), and instances of the types to features. DRAMA rules may consider interfaces, classes, and methods containment types, because parts of the definitions of interfaces, classes, and methods may include other types and fields. Interfaces may include method declarations, classes may include definitions of fields and methods, and methods may include uses of fields and declarations of local variables that represent instances of types.

A developer may map each type and variable in an application to a feature in a feature graph. A class (e.g., class Email) may map to a feature (e.g., Email 304) and be assigned a label identical to the name of the feature, as shown in FG 300 and FG 302. Members of the Email class may map to the same feature. However, a developer may recognize that a mapping does not work for all class members, and may remap a method (e.g., FG 302 where Encrypt maps to the feature Crypto 306 and method Spellcheck maps to the feature Spellcheck 308).

Figure 4:
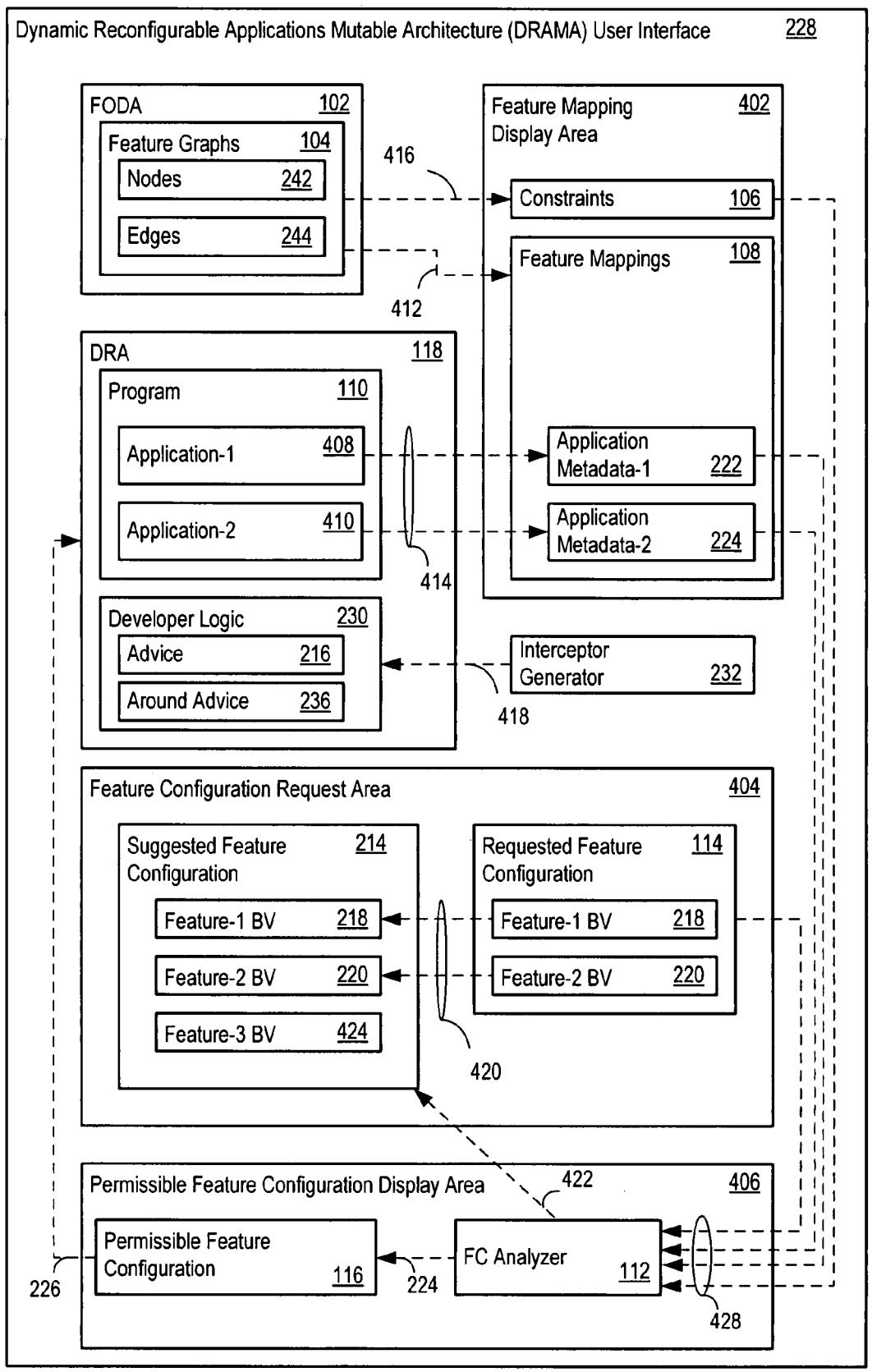
FIG. 4 shows feature graphs (FG) for an e-mail system.

FIG. 4 shows a dynamically reconfigurable applications mutable architecture (DRAMA) user interface 228. The DRAMA user interface 228 may include a feature mapping display area 402, a feature configuration request area 404 and a permissible feature configuration display area 406. A developer may use the feature mapping display area 402 to map features to application logic (e.g., program 110 logic, application-1 408 and application-2 410) to obtain feature mappings 108. DRAMA user interface 228 may assist a developer to identify FG 104, and application-1 408 and application-2 410 metadata (e.g., application metadata-1 238 and application metadata-2 240) to include in the feature mapping display area 402 to obtain feature mappings 108, indicated by the arrow 412 and arrows 414 drawn from FG 104, and Application-1 408 and Application-2 410, respectively. DRAMA user interface 228 may also assist a developer to identify FG 104 include in the feature mapping display area 402 to obtain constraints 106, indicated by the arrow 416 drawn from FG 104 to constraints 106. Once a developer maps the types and variables of an application to features to obtain feature mappings 108, the remaining process of retrofitting dynamic reconfiguration capabilities into the application (e.g., program 110) may include two steps: locating variation points (e.g., line 4 of Table 6) in the application logic, and placing (e.g., weaving) interceptor logic that activates and deactivates features attached at variation points.

The feature mapping display area 402 may assist a developer to identify relations among variables and method calls mapped to corresponding features that define the location of variation points. Variation points (e.g., line 4 of Table 6) may be located where logical expressions use the variables and where a feature at one end of a variation point maps a variable used within a type mapped to another feature at the other end of the variation point. A variation point may also be located where logic passes an object of a feature type as a parameter to a method of another feature type. The feature mapping display area 402 may assist a developer to check feature labels assigned to variables and methods in expressions in the context of the use of the variables and methods to reduce the task of locating variation points.

Interceptors (e.g., developer logic) may bypass application logic at variation points entirely (e.g., deactivating a feature) and execute alternative logic. The developer may author interceptors (e.g., developer logic 230) and weave the interceptor logic into the application using a binary rewriting mechanism. The developer logic 230 may execute separately from the application feature logic and rather than deactivate a feature may enhance or limit the feature functionality. DRAMA user interface 228 may provide a developer an interceptor generator 232 to generate and/or assist a developer to generate developer logic 230, indicated by the arrow 418 drawn from interceptor generator 232 to developer logic 230.

The DRAMA user interface 228 may assist a developer to locate variation points in the application logic based on the mappings between application variables and types and features in a FG (e.g., FG 300 and FG 302). Developers may use feature oriented domain analysis (FODA) 102 and tools to produce and select FGs 104 (e.g., FG 300 and FG 302). The DRAMA user interface 228 may assist developers to identify inconsistencies between a selected FG (e.g., FG 300) and the logic of a corresponding DRA 118. Once the developer determines the variation points (e.g., line 4 of Table 6 above), DRAMA 228 may assist developers to generate developer logic 230 (e.g., interceptors) that replaces the use of variables and method calls related to deactivated features. The DRAMA user interface 228 may assist developers to weave the generated components (e.g., developer logic 230) into applications (e.g., program 110) automatically to obtain DRA 118, eliminating the need to modify the legacy application logic.

In one implementation, DRAMA 100 employs Aspect-Oriented Programming (AOP) to provide developers with the option to weave logic (e.g., interceptor such as developer logic 230) at compile time and run-time to obtain a DRA 118. AOP defines join points as well-defined points in the application logic of a program at which a DRA 118 may trigger advice 216. AOP employs join points as placeholders for interceptors that refine program (e.g., collection of applications) functionality to deliver reconfigurable activation and deactivation features. AOP implements interceptors as advice 216, which developers may insert in the executable program logic at the join points using run-time aspect weavers (e.g., interceptor generator 232). In one implementation, DRAMA 100 employs 'around advice' 236 to implement interceptors (e.g., developer logic 230) that activate and deactivate features. DRAs 118 may invoke around advice 236 instead of the legacy application logic (e.g., application-1 408 and application-2 410) at join points to bypass legacy application logic and to execute advice 216 and/or around advice 236 code (e.g., developer logic 230) at the join points. Developers may implement around advice 236 defined by the signatures of the variation points (e.g., AOP pointcuts) so that feature and deactivation functionality can be added at any time during the software life-cycle without modifying the application logic (e.g. 110). In one implementation, DRAMA 100 may employ AspectWerkz to provide a dynamic, lightweight and high-performance AOP framework for Java that utilizes bytecode (e.g., instructions) modifications to weave classes at project build time, class load time, or runtime. AspectWerkz may hook into applications using a standardized Java Virtual Machine (JVM). DRAMA 100 may generate wrappers for aspects 234, advice 216 and around advice 236 in plain Java, and specify join points in eXtensible Markup Language (XML) files so that aspects 234, advice 216 and around advice 236 may be executed as though native logic to the legacy application logic.

The feature configuration request area 404 may a user to identify a requested feature configuration 114 and indicate the individual features requested (e.g., feature-1 BV 218 and feature-2 BV 220). The FC analyzer 112 may determine that the requested feature configuration 114 violates a constraint 106 and present a suggested feature configuration 214 as an alternative, indicated by the arrow 422 drawn from FC analyzer 112 to suggested feature configuration 214. For example, the FC analyzer 112 may present a suggested feature configuration 214 that includes a feature the user did not request (e.g., feature-3 BV 422) that in combination with the requested features (e.g., feature-1 BV 218 and feature-2 BV 220) define a permissible feature configuration 116. The arrows drawn from the requested feature configuration 114 to the suggested feature configuration 214 indicate by 420 reflect features FC analyzer 112 may combine with feature-3 BV 424 to obtain a suggested feature configuration 214 that FC analyzer 112 determines permissible. The permissible feature configuration display area 406 may present a permissible feature configuration 116 indicated by the permissibility indicator 224 drawn as an arrow from the FC analyzer to the permissible feature configuration 116. The permissible feature configuration display area 406 may present FC analyzer 112 analysis and the inputs to the FC analyzer 112 used to evaluate the permissibility of a requested feature configuration 114, indicated by the arrow 428 drawn to the FC analyzer 112 from the constraints 106, application metadata-1 238, application metadata-2 240, and requested feature configuration 114. In one implementation, the permissible feature configuration display area 406 may receive user input accepting the permissible feature configuration 116 indicating that reconfigurator 226 may invoke developer logic 230 (e.g., advice 216 and around advice 236).

Figure 5:
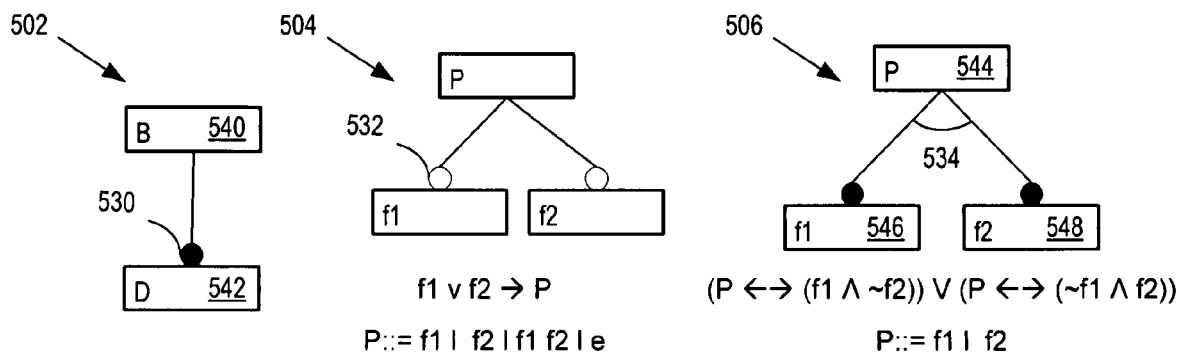
FIG. 5 illustrates translations of feature graphs (FG) into corresponding propositional logic formulae (PLF) and context-free grammar (CFG) constructs.
Figure 5:
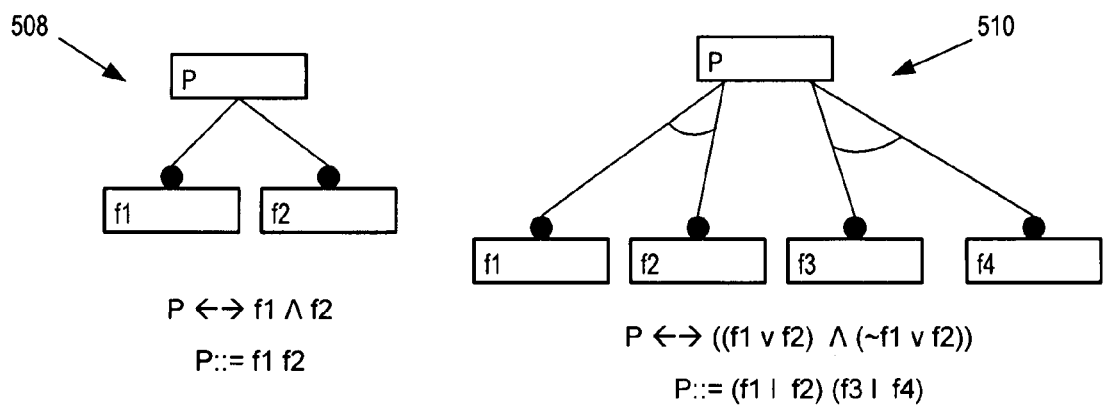
Figure 5:
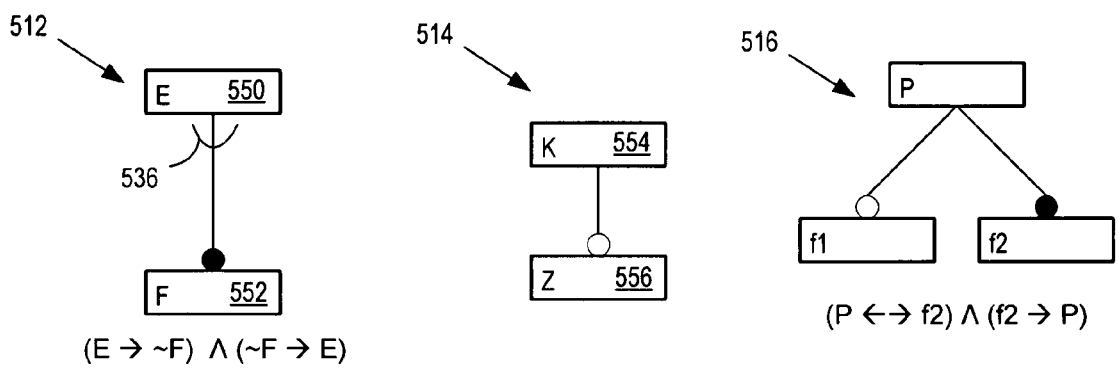
Figure 5:
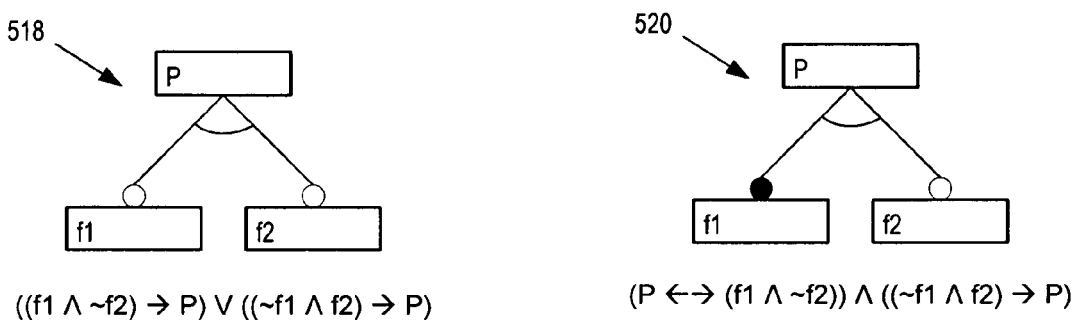

FIG. 5 illustrates translations of feature graphs (e.g., FG 502, FG 504, FG 506, FG 508, FG 510, FG 512, FG 514, FG 516, FG 518, and FG 520) into corresponding propositional logic formulae (PLF) and context-free grammar (CFG) constructs. Each feature graph expresses rules of interactions among features and constraints imposed on the features. A developer may map the types and variables of an application to features and employ DRAMA 100 to formalize the description of a DRA 118 to verify the properties of the DRA 118. Feature graphs express feature configuration constraints on product lines (e.g., applications with multiple components or models) through various formalisms (e.g., Context-Free Grammars (CFGs) and Propositional Logic Formulae (PLF)). Feature graphs may be represented by corresponding feature-oriented context-free grammar (FOCFG) described by a corresponding PLF. Terminals designate feature identifiers in FOCFG. Each feature graph has a corresponding FOCFG and can be described by a corresponding PLF. CFGs include production rules used to define a structure of a system. Production rules of grammar may include terminals (e.g., feature identifiers) and non-terminals (e.g., composite feature) which can be derived from sequences of terminals. Literals, unary negation operator, and binary connectives inductively form truth-functional combinations (e.g., PLF). Each PLF maps to a truth function with a value of true or false. Feature graphs may have equivalent representations using CFGs and PLF, and a developer may map a feature graph onto a CFG and a PLF.

The feature graphs shown in FIG. 5 use two basic connectors: 'and' and 'or'. A connector drawn with a solid black circle (e.g., 530 shown in FG 502) indicates that a child feature should always be attached to a parent feature. A connector drawn with an empty circle (e.g., 532 shown in FG 504) indicates that a child feature may be optionally attached to a parent feature. An arc (e.g., 534 shown in FG 506) that links two or more connectors indicates that features attached to the circles of the connectors are mutually exclusive. The connectors combine to form four basic types of FGs: optional (e.g., FG 504), alternative (FG 506), mandatory (FG 508), and or-feature (e.g., FG 510). For each feature graph DRAMA 100 may translate the rules into corresponding PLF and CFG production rules. DRAMA 100 may assist developers to compose complex feature graphs out of basic FGs to obtain corresponding PLF and CFG.

DRAMA 100 may assist developers to compose complex feature graphs out of basic FGs to obtain corresponding PLF and CFG. A FOCFG includes a set of productions that include a left-hand side (LHS) and a right-hand side (RHS). A production may have a non-terminal on the left-hand side and terminals and non-terminals on the right-hand side. Productions may reveal the features (on the right side) that a composite feature (on the left side) contains. A sequence of terminals that designate feature identifiers and non-terminals define the RHS. Valid configurations of a FG may be represented by a sentence structure (e.g., grammar) and satisfy a corresponding FOCFG. A feature terminal maps to a corresponding Boolean variable in a PLF, where a true value indicates a corresponding active feature in a feature configuration. For example, FG 504 may be translated into Boolean expression $f1 \vee f2 \rightarrow P$ with PLF P::=f1|f2|f1 f2|e.

FIG. 5 further shows examples of feature dependencies that indicate that services (e.g., features) may be orthogonal so that the services may be added or removed from applications without affecting each other. FG 502 shows an example of feature dependencies where service B 540 and service D 542 depend on each other. FG 502 indicates that service B 540 requires service D 542 to be attached for service B 540 to work. FG 502 also indicates that service D 542 must be attached to service B 540 for service D 542 to work.

FG 506 shows another example of feature dependencies where base service P 544 and service f1 546 and service f2 548 depend on each other. FG 506 includes an arc 534 that indicates that service f1 546 and f2 548 represent mutually exclusive features. Accordingly, FG 512 indicates that base service P 534 must have either service f1 546 or service f2 548, but not both attached for P 544 to work. Either service f1 546 or f2 548 must be attached to the service P 544 for the respective service f1 546 or f2 548 to work.

FG 512 shows an example of feature dependencies where base service E 550 and service F 552 also depend on each other. However, FG 512 includes an arc 536 that indicates that service E 550 and service F 552 represent mutually exclusive features. Accordingly, service E 550 must not have service F 552 attached for service E 550 to work. Similarly, service F 552 must not be attached to service E 550 for service F 552 to work.

FG 514 shows an example of feature dependencies where base service K 554 and service Z 556 depend on each other. FG 542 indicates that service Z 554 may be optionally attached to base service K 554 for service K 554 to work. FG 514 further indicates that service Z 554 must be attached to service K 556 for service Z 554 to work.

The FC analyzer 112 may assist a developer to detect discrepancies between FGs. Discrepancies may indicate that a developer should perform further analysis to identify the appropriate feature graph. The FC analyzer 112 may also assist a developer to detect equivalent feature graphs, as well as suggest alternative and/or equivalent feature graphs. The FC analyzer 112 may present PLFs that can be transformed into feature graphs.

Figure 6:
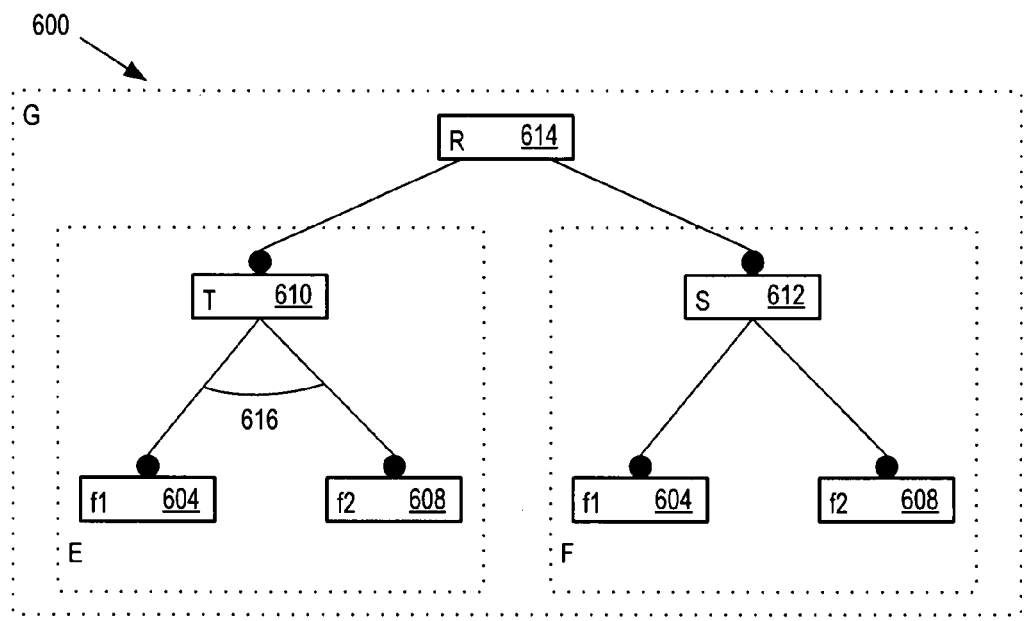
FIG. 6 illustrates an unsound and sound feature graphs (FGs).
Figure 6:
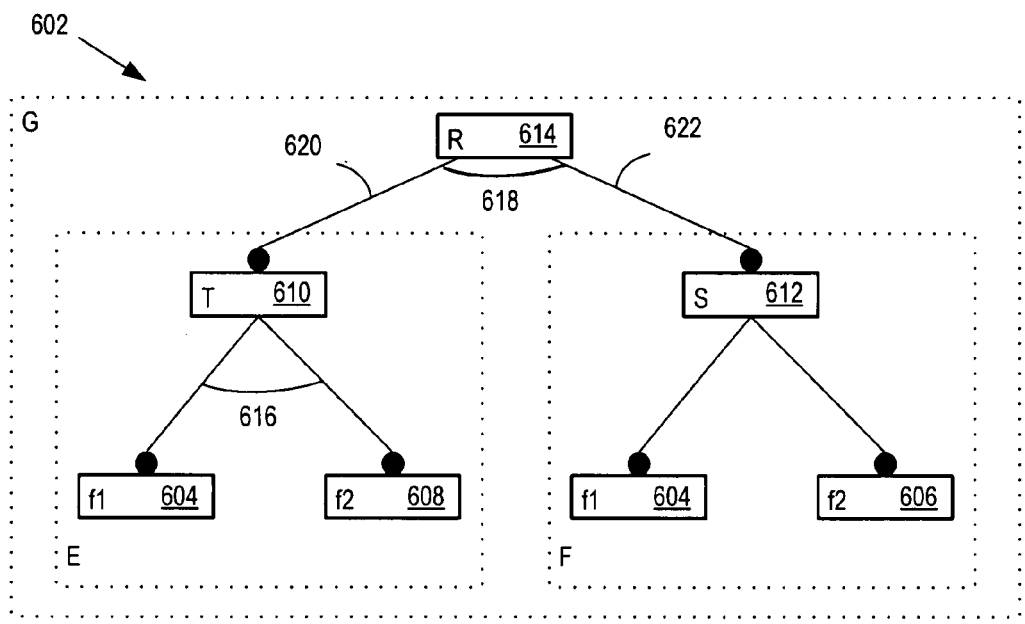

FIG. 6 illustrates unsound and sound feature graphs (FG 600 and FG 602). Often developers implement logic that attaches a feature to other features at different variation points. FG 600 indicates that a developer has implemented features $f_1$ 604 and $f_2$ 608 once and attached the features to T 610 and S 608. DRAMA 100 may determine a FG to be a sound feature graph when a nonempty feature configuration exists (e.g., a feature configuration with at least one feature). FG 600 reflects an example of an unsound FG where no set of features satisfy the constraints for FG 600. The translation formulae of FG 600 expressed through a system of PLFs reflects only one solution [~R, ~T, ~S, ~$f_1$, ~$f_2$], which indicates that the only solution includes a feature configuration where no features can be enabled, and no valid instance of FG 600 exists. The PLF translation considers FG 600 unsound because features T 610 and S 612 represent mandatory features and represent children of feature R 614, and the features T 610 and S 612 include children features $f_1$ 604 and $f_2$ 608. Features $f_1$ 604 and $f_2$ 608 represent mutually exclusive features, indicated by arc 616, attached at variation points to feature T 610. Concurrently, parent feature S 612 requires features $f_1$ 604 and $f_2$ 608.

FG 602 shows a sound feature graph alternative to FG 600. FG 602 includes an arc 618 that links connectors (e.g., edges 620 and 622). The PLF for G changes in the system of PLFs, while PLFs for F and E remain the same. The new PLF for G resolves to G≡(R←→(E∧~F))∨(R←→(~E∧F)). The PLFs for FG 602 reflect three solutions: [R, ~S, T, $f_1$, ~$f_2$], [R, ~S, T, ~$f_1$, $f_2$] and [R, S, ~T, $f_1$, $f_2$].

Figure 7:
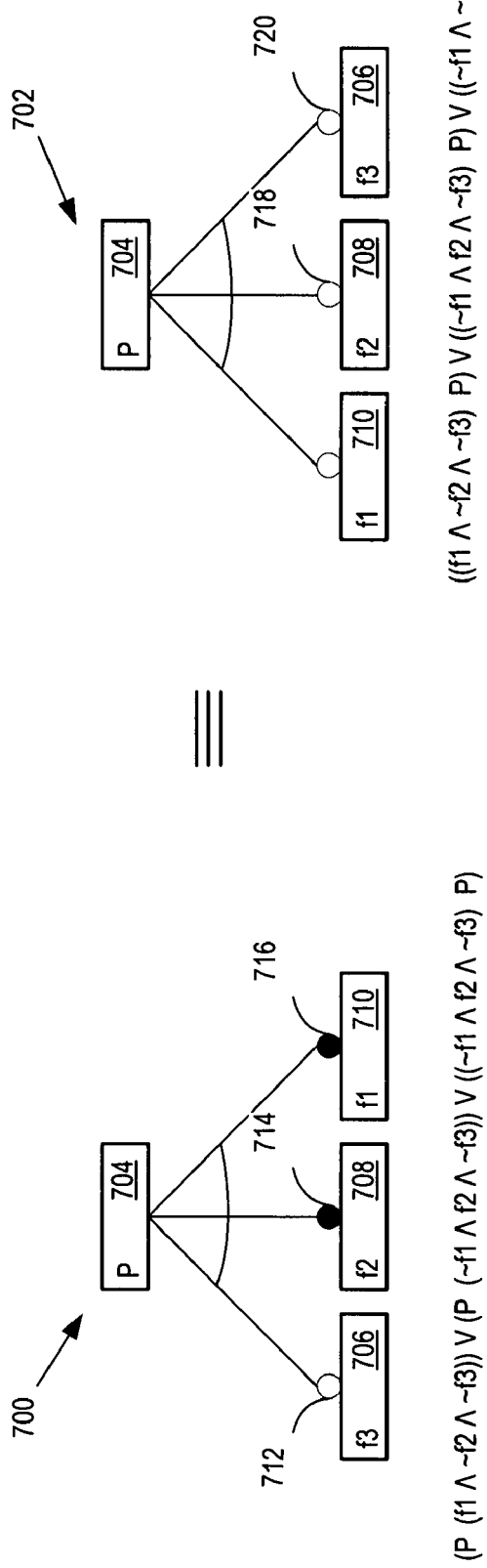
FIG. 7 shows an example of two equivalent feature graphs (FGs).

FIG. 7 shows an example of two equivalent feature graphs (FG 700 and FG 702). The FC analyzer 112 considers two feature graphs to be equivalent when the two feature graphs instantiate the same set of configurations. The PLF for FG 700 resolves to (P←→(f1∧~f2∧~f3))∨(P←→(~f1∧f2∧~f3))∨((~f1∧f2∧~f3)→P). The PLF for the FG 702 resolves to ((f1∧~f2∧—f3)→P)∨((~f1∧f2∧~f3)→P)∨((~f1∧~f2∧f3)→P). The formula (left → right ∧ right → left) describes the equivalence of the feature configurations (e.g., FG 700 and FG 702). Substituting corresponding PLFs for FG 700 and FG 702 a tautology formula results that indicates that FG 700 and FG 702 equal.

Figure 8:
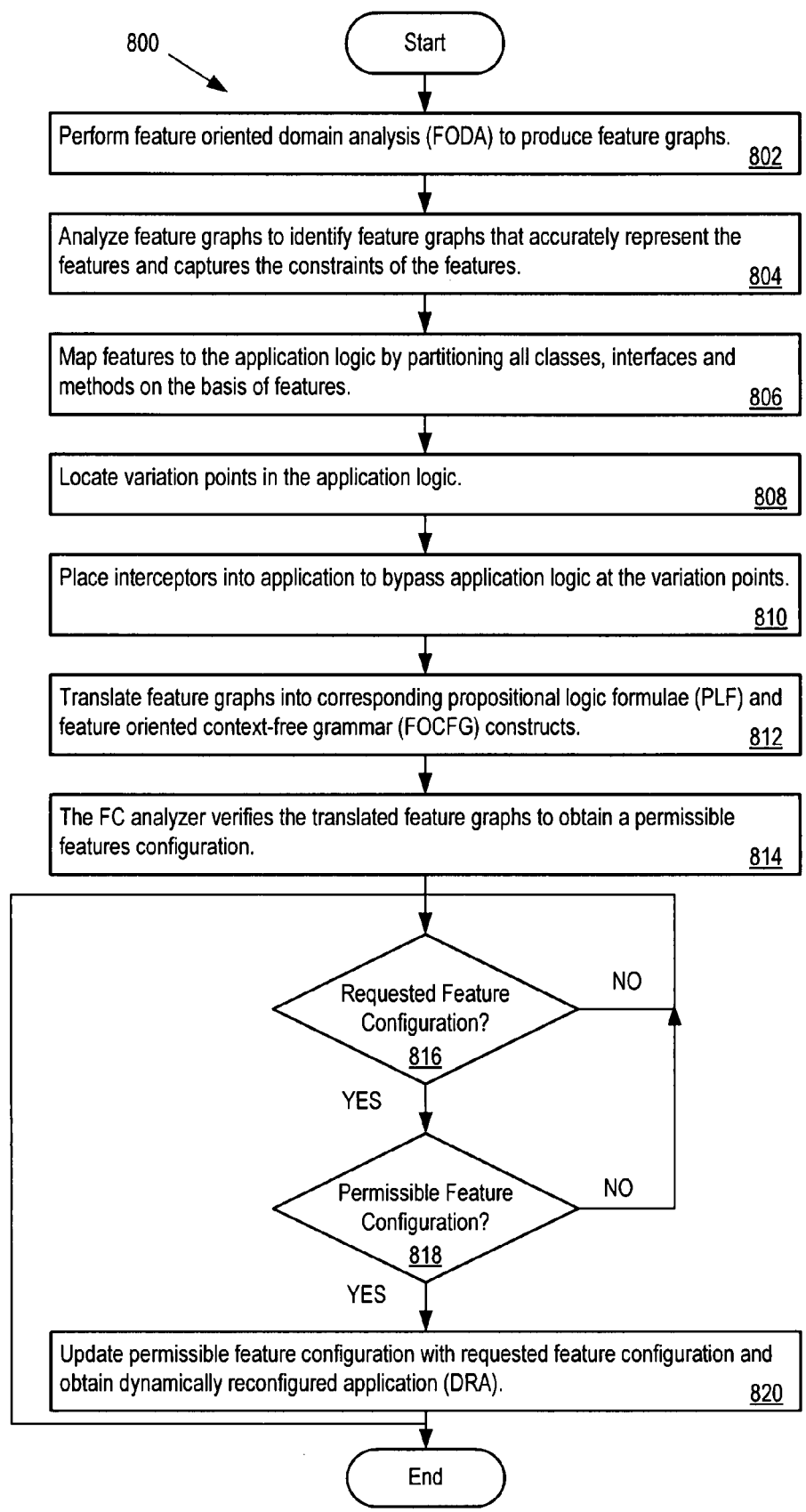
FIG. 8 shows the acts that a feature configuration (FC) analyzer may take to verify the permissibility of a requested feature configuration.

FIG. 8 shows the acts that a FC analyzer 112 may take to verify the permissibility of a requested feature configuration. A developer may perform feature oriented domain analysis 102 on a legacy application (e.g., program 110) to produce feature graphs (802). The developer may analyze the feature graphs 104 to identify ensure that the feature graphs that accurately represent the features of the legacy application and capture the constraints 106 of the features (804). The developer may produce feature mappings 108 that map the feature to the legacy application logic (e.g., program 110) (806). The developer may locate the variation points within the legacy application where the application logic attaches variables to features (808). The developer may place interceptors (e.g., logic fragments and alternative developer logic 230) into the application at the variation points (810) so that features may be activated and deactivated based on permissible feature configurations. The developer may translate the feature graphs into corresponding propositional logic formulae (PLF) and feature oriented context-free grammar (FOCFG) constructs so that Boolean variables represent each feature (812). The DRAMA FC analyzer 112 may verify the translation of the feature graphs to obtain a permissible features configuration 116 (814). The feature configuration listener 212 may monitor requests for feature configuration changes and forwards a requested feature configuration 114 to the FC analyzer 112 (816). The FC analyzer 112 may verify the permissibility of the requested feature configuration 114 (818). The FC analyzer 112 may update the permissible feature configuration 116 with the verified requested feature configuration 114 to obtain the DRA 118 (820). The FC analyzer 112 may verify the permissibility of the requested feature configuration 114 (818). The FC analyzer 112 may present a suggested feature configuration 214 where the FC analyzer 112 determines the requested feature configuration 114 to be impermissible.

Features included in a feature configuration form a path between any two nodes, because a feature graph may be represented by a tree in which all the leaves (e.g., features) of the tree connect to each other by branches (e.g., edges). Moreover, a path between any two compatible features in a subset of a feature graph denotes a permissible configuration with respect to the two features only. FC analyzer 112 may determine the existence of a path between two features algorithmically. In one implementation, the FC analyzer 112 may attempt to identify a global solution to the feature configuration representing the entire feature set.

Figure 9:
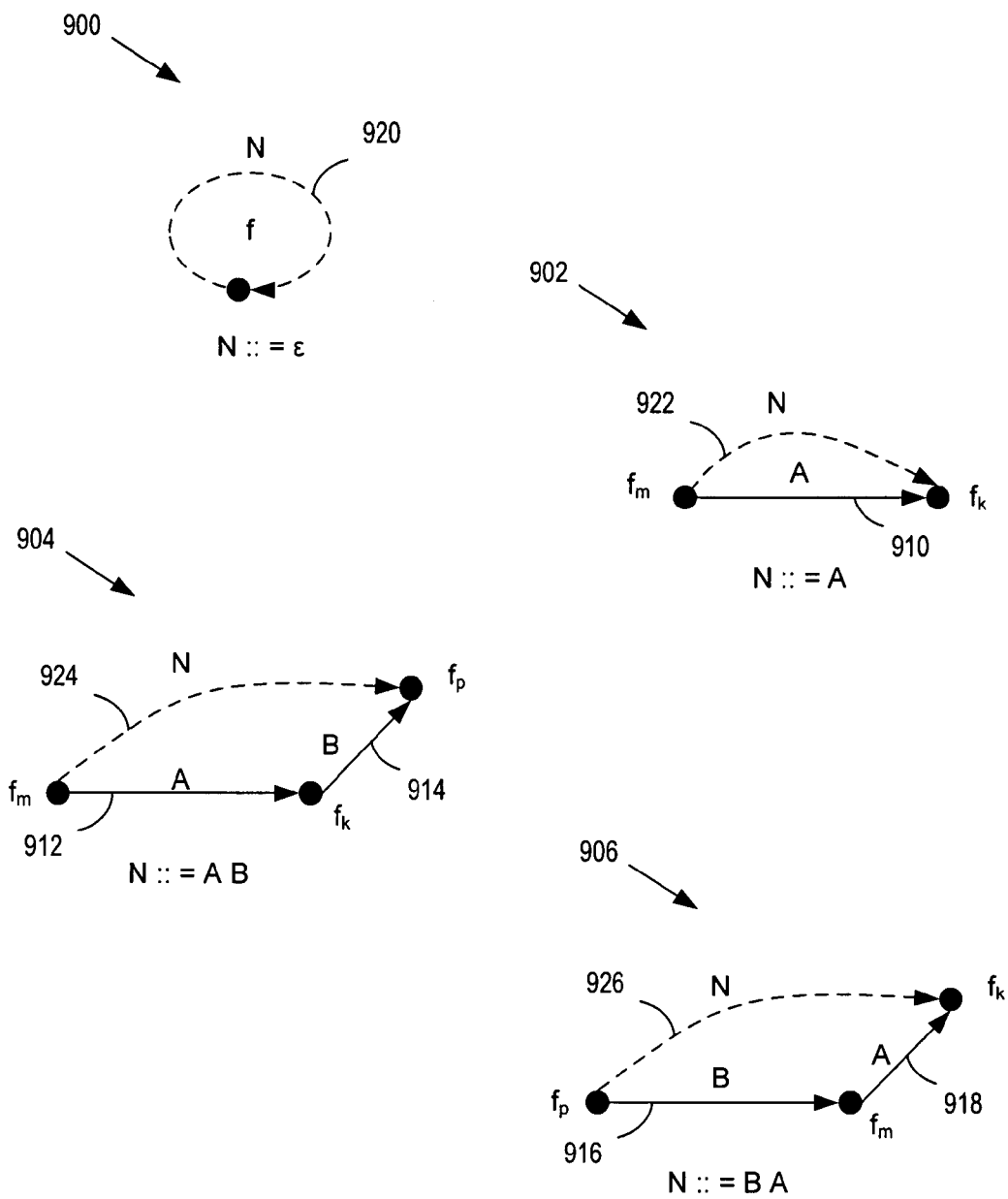
FIG. 9 shows examples of edge induction used in the feature configuration analyzer.

FIG. 9 shows four cases of edge inductions (e.g., edge induction graphs 900, 902, 904, and 906) handled by the FC analyzer 112 using a pathway analyzer logic (e.g., a pathway analyzer program). The edge inductions 902-906 shown in FIG. 9 illustrate the analysis the FC analyzer 112 may use to solve a technical problem known as the context-free language (CFL) reachability problem in order to determine the permissibility of a feature configuration. In one implementation, the FC analyzer 112 uses a polynomial-time dynamic programming algorithm to solve the CFL reachability problem. DRAMA 100 may transform a FOCFG grammar that expresses several feature terminals F and non-terminals N into a directed graph G with edges labelled with members of Σ=F∪N and nodes representing feature terminals. Performing edge induction analysis may include determining all pairs of nodes (e.g., <fm, fk> shown in 902, <fm, fp> shown in 904) such that the analysis identifies all the paths in G between two given features. The path between given feature terminals (nodes in G) may include different feature terminals and non-terminals. In one implementation, FC analyzer 112 adds new edges labelled with non-terminal symbols to graph G until the FC analyzer 112 has found all the paths between each pair of feature terminals or until no more edges can be added (e.g., when the FC analyzer 112 identifies the edges between all the terminals and non-terminals, no more edges can be added). In one implementation, DRAMA 100 uses a worklist-based CFL-reachability algorithm to normalize the FOCFG, using a modified Chomsky Normal Form Grammar (CNFG) in which the RHS (right hand side) of each production has at most two symbols from Σ, empty or epsilon (ε) productions, and no restrictions exist regarding where terminal symbols may appear. Productions in the normal form may have one of the following forms: N::=ε, shown by the edge induction graph 900, N::=A, shown by the edge induction graph 902, N::=AB, shown by the edge induction graph 904, and N::=BA, shown by the edge induction graph 906, where N represents a non-terminal and A, B∈Σ. For example, production N::=AbCd may be converted into productions N::=$N_1N_2$, $N_1$::=Ab, and $N_2$::=Cd. The FC analyzer 112 may perform the transformation in an amount of time linearly equal to the size of the grammar.

During the edge induction analysis, the FC analyzer 112 may create a worklist of edges W and initialize the worklist with all the edges (e.g., 910, 912, 914, 916, and 918) in an original induction graph G. The FC analyzer 112 may add edges to W for ε-productions that represent alternative pathways between features not found in the original graph G, shown in the edge induction graphs 900, 902, 904, and 906 as edges 920, 922, 924, and 926. The FC analyzer 112 may add the edge 922 to W for productions shown in edge induction graph 902 not found in the original graph G. In other words, edge 922 may represent other pathways between features fm and fk that FC analyzer 112 adds to W. The FC analyzer 112 may use the edge induction case shown in edge induction graph 904 to compute a transitive closure that results in adding edge 924 to W for each production N::=AB that corresponds to covering the outgoing edge 914. The FC analyzer 112 may analyze the incoming edge 916 by adding edge 926 for each production N::=BA shown in edge induction graph 906.

The FC analyzer 112 may calculate feature compatibility in polynomial time $O(|f|^3)$, where $|f|$ represents the number of features in FOCFG (nodes in graph G). FC analyzer 112 may perform the analysis in polynomial time by transforming feature graphs into grammars and using derivation trees for the grammars to determine a path between two given terminals. In general $O(|\Sigma|^3|f|^3)$ represents the running time of the FC analyzer algorithm, where $|\Sigma|$ represents the size of the grammar, or the number of feature terminals and non-terminals in FOCFG, and $|f|$ represents the number of features in FOCFG (e.g., nodes in graph G). For a fixed grammar, $|\Sigma|$ represents a constant, and therefore the running time complexity of the FC analyzer 112 equals $O(|f|^3)$.

Figure 10:
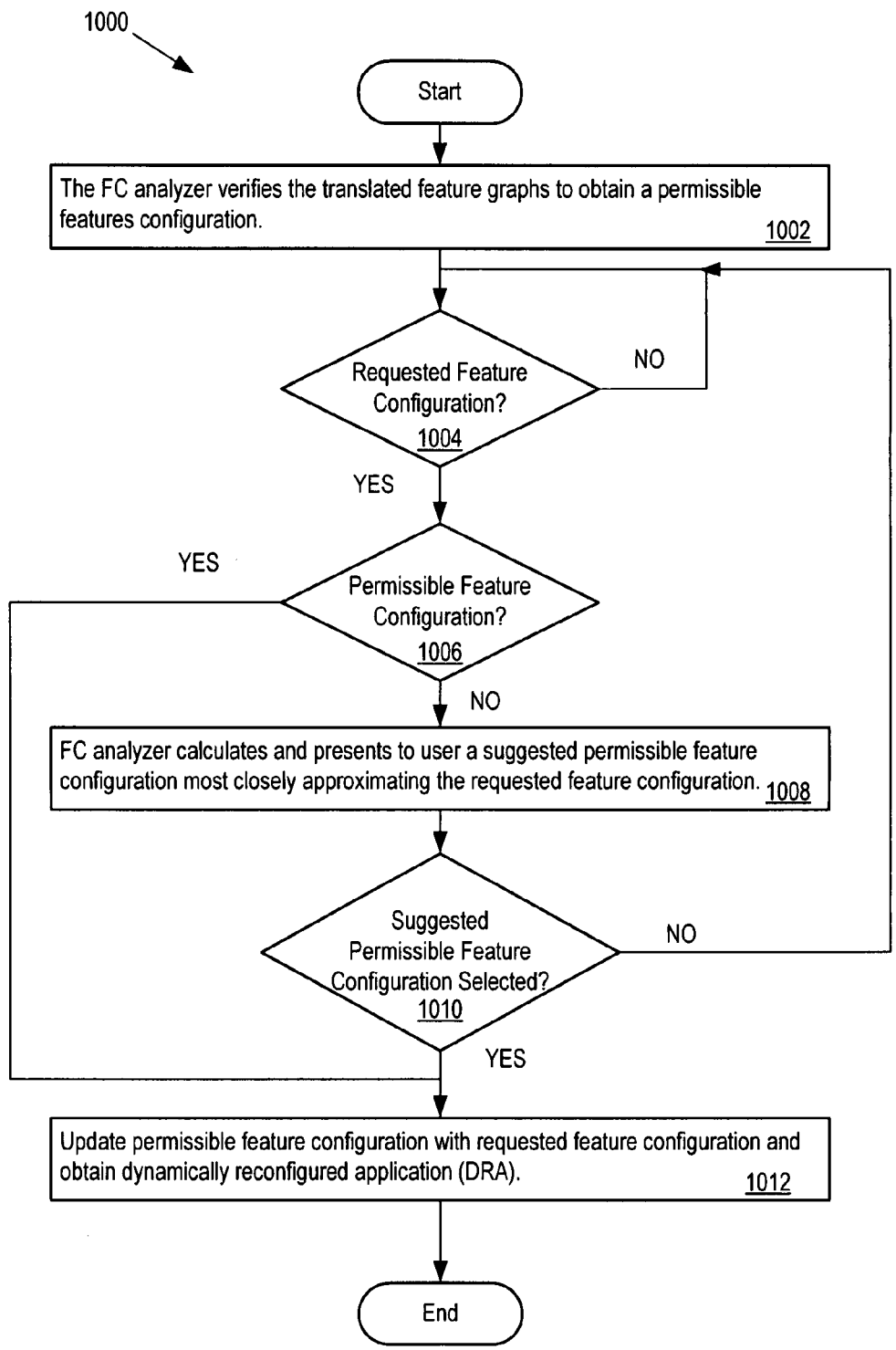
FIG. 10 shows the acts that the feature configuration (FC) analyzer may take to suggest a permissible feature configuration based on a requested impermissible feature configuration.

FIG. 10 shows the acts that the FC analyzer 112 may take to suggest a permissible feature configuration based on a requested impermissible feature configuration. The FC analyzer 112 may calculate a suggested feature configuration 214 that most closely approximates the requested feature configuration 114 based calculating and analyzing various feature configurations considered permissible that include the greatest number of features that match the requested feature configuration 114 (1008). The FC analyzer 112 may present the suggested feature configuration 214 to the user so that the user may acknowledge and select the suggested feature configuration 214 (1010). The FC analyzer 112 may update the permissible feature configuration 116 with the suggested feature configuration 214 selected by a user (1012).

The results of the FC analyzer 112 reflect a performance improvement over the results obtained by applying satisfiability problem solvers (SAT-solvers) such as the SatZoo SAT-solver to the context-free language (CFL) reachability problem. The FC analyzer 112 processed FOCFGs of different sizes as experimental data to compare the running time of the FC analyzer 112 with the SatZoo. A FOCFGs generator produced context-free grammars based on simple rules. The FOCFGs generator analyzes the number of features 'n' and computes the height of the feature grammar tree 'h', such that $\log_2 n <= h <= \log_2(n+1)$. The height of the tree represents the number of non-terminals in the grammar that represent nodes. The leaves of the tree represent feature terminals. The FOCFGs generator produced one and only one S-path between each two feature terminals. Additional S-paths between two feature terminals by selecting a leaf that does not include any of the terminals and making it a node by assigning a new non-terminal to it. Then we make two leaves attached to the non-terminal node (e.g. the old terminal feature leaf and the feature terminal leaf located in the S-path). The FC analyzer 112 testing employed a PLF in Conjunctive Normal Form (CNF) for the generated FOCFG written in the DIMACS graph format (i.e., a de-facto standard for encoding satisfiability problems). Using the correspondence between FOCFG and PLF, the FC analyzer 112 tester translated grammar obtained by using the FOCFG generator into a PLF in the DIMACS format.

Table 7 shows the results of the FC analyzer 112 testing. The FC analyzer 112 testing varied the number of features, the number of S-paths that connect two selected features in the FOCFG, and measured the time taken by SatZoo to compute a configuration that contains the two features as well as the time taken by the FC analyzer 112 to determine whether a feature configuration exists that contains the two features. The FC analyzer 112 testing indicates that the FC analyzer 112 significantly outperforms the SatZoo when a feature configuration includes many features. Thus, the FC analyzer 112 provides a substantial benefit in analyzing real-world problems associated with configuring ever more complex software.

TABLE 7

Test Results

| Number of Features | Number of Paths | SATZoo time, sec | FC Analyzer time, sec |
|---|---|---|---|
| 10 | 10 | 0.003 | 0.07 |
| 10 | 20 | 0.0012 | 0.073 |
| 10 | 40 | 0.0006 | 0.082 |
| 50 | 10 | 0.16 | 1.61 |
| 50 | 500 | 0.07 | 1.28 |
| 50 | 1,000 | 0.023 | 1.32 |
| 300 | 100 | 46.3 | 5.13 |
| 300 | 10,000 | 39.4 | 8.24 |
| 300 | 30,000 | 36.2 | 8.63 |
| 1,000 | 100 | 85.9 | 12.9 |
| 1,000 | 10,000 | 96.4 | 14.3 |
| 1,000 | 100,000 | 78.6 | 12.1 |
| 3,000 | 1,000 | 627.5 | 15.6 |
| 3,000 | 100,000 | 113.2 | 19.3 |
| 3,000 | 1,000,000 | 92.3 | 19.2 |

DRAMA 100 reduces time, cost, and other resource expenditures associated with customizing a legacy application (e.g., program 110) so that application features can be activated, deactivated, and even altered without requiring a user to reprogram or reinstall the application. DRAMA 100 provides a developer a way to deliver DRAs 118 that enable users to switch between configurations during run-time by specifying a requested feature configuration. Employing DRAMA 100 developers may build DRAs 118 from legacy applications (e.g., programs 110), verify the validity of a user requested combination of features (e.g., request feature configuration 114), and reconfigure DRAs 118 during run-time (e.g., using the reconfigurator 226).

The FC analyzer 112 identifies permissible feature configurations 116 for a product line so that vendors can offer consumers highly customizable products. The FC analyzer 112 allows vendor to offer consumers an extensive selection of feature configurations for products, accept customized feature configurations (e.g., requested feature configurations 114) from customers, and implement the features (e.g., permissible feature configurations 116) for the customer. A vendor may embed the FC analyzer 112 into a user interface that enables consumers to consider feature configurations prior to purchasing a product. The FC analyzer 112 provides an efficient approach to rapidly determine permissible feature configurations for a product line, and verify the validity of a user requested combination of features.

A number of implementations have been described. Nevertheless, it will be understood that various modifications may be made without departing from the spirit and scope of the invention. Accordingly, other implementations are within the scope of the following claims.

What is claimed is:

1. A method for determining a permissible feature configuration, the method comprising:
   receiving feature constraints for features of a product;
   receiving a feature mapping of the features of the product, the feature mapping comprising a first feature node corresponding to a first feature and a second feature node corresponding to a second feature;

identifying a logical pathway between the first feature node and the second feature node, further comprising determining a first graph edge representing a relationship between the first feature node and the second feature node, the relationship comprising a first constraint on permissibility of the first feature with respect to the second feature and a second constraint on permissibility of the second feature with respect to the first feature;

producing a production for the logical pathway;

evaluating the production;

setting a permissibility indicator to 'true' when the production evaluates to true; and setting a permissibility indicator to 'false' when the production evaluates to false.

2. The method of claim 1, where identifying a logical pathway further comprises:
determining a second graph edge representing a second relationship between the first feature node and the second feature node, the second graph edge being different from the first graph edge.

3. The method of claim 2, where identifying a logical pathway further comprises:
determining a second pathway between the first feature node and the second feature node, wherein the second pathway comprises the second graph edge.

4. The method of claim 3, wherein producing a production further comprises: combining the first pathway and the second pathway to produce the production representing the logical pathways between the first feature node and the second feature node.

5. The method of claim 3, further comprising:
determining a third pathway between the first feature node, the second feature node and a third feature node, wherein the third feature node is positioned between the first feature node and the second feature node on the third pathway; and
combining the first pathway and the third pathway to produce a second production representing the logical pathways between the first feature node and the second feature node.

6. A system for determining a permissible feature configuration, the system comprising:
a processor;
a memory coupled to the processor, the memory comprising:
feature constraints for features of a product;
a feature mapping of the features of the product, the feature mapping comprising:
a first feature node corresponding to a first feature;
a second feature node corresponding to a second feature; and
a logical pathway between the first feature node and the second feature node;
a pathway analyzer program operable to produce a production for the logical pathway, and to determine a first graph edge that represents a relationship between the first feature node and the second feature node, wherein the relationship comprises a first constraint on permissibility of the first feature with respect to the second feature and a second constraint on permissibility of the second feature with respect to the first feature; and
an evaluation program operable to:
evaluate the production;
set a permissibility indicator to 'true' when the production evaluates to true; and
set a permissibility indicator to 'false' when the production evaluates to false.

7. The system of claim 6, where the pathway analyzer program is further operable to:
determine a second graph edge that represents a second relationship between the first feature node and the second feature node, wherein the second graph edge is different from the first graph edge.

8. The system of claim 7, where the pathway analyzer program is further operable to:
determine a second pathway between the first feature node and the second feature node, wherein the second pathway comprises the second graph edge.

9. The system of claim 8, where the pathway analyzer program is further operable to:
combine the first pathway and the second pathway to produce the production that represents the logical pathways between the first feature node and the second feature node.

10. The system of claim 8, where the pathway analyzer program is further operable to:
determine a third pathway between the first feature node, the second feature node and a third feature node, wherein the third feature node is positioned between the first feature node and the second feature node on the third pathway; and
combine the first pathway and the third pathway to produce a second production representing the logical pathways between the first feature node and the second feature node.

11. A product for determining a permissible feature configuration, the product comprising:
a machine readable medium; and
logic stored on the medium operable to:
establish feature constraints for features of a product in memory;
establish a feature mapping of the features of the product in memory, the feature mapping comprising:
a first feature node corresponding to a first feature;
a second feature node corresponding to a second feature; and
identify a logical pathway between the first feature node and the second feature node;
determine a first graph edge that represents a relationship between the first feature node and the second feature node, wherein the relationship comprises a first constraint on permissibility of the first feature with respect to the second feature and a second constraint on permissibility of the second feature with respect to the first feature;
analyze the logical pathway to produce a production for the logical pathway; and
evaluate the production, the evaluation comprising;
setting a permissibility indicator to 'true' when the production evaluates to true; and
setting a permissibility indicator to 'false' when the production evaluates to false.

12. The system of claim 11, where the logic is further operable to:
determine a second graph edge that represents a second relationship between the first feature node and the second feature node, wherein the second graph edge is different from the first graph edge.

13. The product of claim 12, where the logic is further operable to: determine a second pathway between the first feature node and the second feature node, wherein the second pathway comprises the second graph edge.

14. The product of claim 13, where the logic is further operable to:
combine the first pathway and the second pathway to produce the production that represents the logical pathways between the first feature node and the second feature node;
determine a third pathway between the first feature node, the second feature node and a third feature node, wherein the third feature node is positioned between the first feature node and the second feature node on the third pathway; and
combine the first pathway and the third pathway to produce a second production representing the logical pathways between the first feature node and the second feature node.

15. A method for determining a permissible feature configuration, the method comprising:
receiving feature constraints for features of a product;
receiving a feature mapping of the features of the product, the feature mapping comprising a first feature node corresponding to a first feature and a second feature node corresponding to a second feature;
identifying a logical pathway between the first feature node and the second feature node;
producing a production for the logical pathway;
evaluating the production;
setting a permissibility indicator to 'true' when the production evaluates to true; and
setting a permissibility indicator to 'false' when the production evaluates to false,
wherein identifying a logical pathway comprises:
determining a first graph edge representing a first relationship between the first feature node and the second feature node,
determining a second graph edge representing a second relationship between the first feature node and the second feature node, the second graph edge being different from the first graph edge, and
determining a second pathway between the first feature node and the second feature node, wherein the second pathway comprises the second graph edge, and
wherein producing a production further comprises combining the first pathway and the second pathway to produce the production representing the logical pathways between the first feature node and the second feature node.

16. A system for determining a permissible feature configuration, the system comprising:
a processor;
a memory coupled to the processor, the memory comprising:
feature constraints for features of a product;
a feature mapping of the features of the product, the feature mapping comprising:
a first feature node corresponding to a first feature;
a second feature node corresponding to a second feature; and
a logical pathway between the first feature node and the second feature node;
a pathway analyzer program operable to produce a production for the logical pathway; and
an evaluation program operable to:
evaluate the production;
set a permissibility indicator to 'true' when the production evaluates to true; and
set a permissibility indicator to 'false' when the production evaluates to false,
wherein the pathway analyzer program is further operable to:
determine a first graph edge that represents a first relationship between the first feature node and the second feature node,
determine a first graph edge that represents a first relationship between the first feature node and the second feature node,
determine a second graph edge that represents a second relationship between the first feature node and the second feature node, wherein the second graph edge is different from the first graph edge, and
combine the first pathway and the second pathway to produce the production that represents the logical pathways between the first feature node and the second feature node.

17. A product for determining a permissible feature configuration, the product comprising:
a machine readable medium; and
logic stored on the medium operable to:
establish feature constraints for features of a product in memory;
establish a feature mapping of the features of the product in memory, the feature mapping comprising:
a first feature node corresponding to a first feature;
a second feature node corresponding to a second feature; and
identify a logical. pathway between the first feature node and the second feature node;
analyze the logical pathway to produce a production for the logical pathway; and
evaluate the production, the evaluation comprising;
setting a permissibility indicator to 'true' when the production evaluates to true; and
setting a permissibility indicator to 'false' when the production evaluates to false,
wherein the logic is further operable to:
determine a first graph edge that represents a first relationship between the first feature node and the second feature node,
determine a second graph edge that represents a second relationship between the first feature node and the second feature node, wherein the second graph edge is different from the first graph edge,
determine a second pathway between the first feature node and the second feature node, wherein the second pathway comprises the second graph edge,
combine the first pathway and the second pathway to produce the production that represents the logical pathways between the first feature node and the second feature node,
determine a third pathway between the first feature node, the second feature node and a third feature node, wherein the third feature node is positioned between the first feature node and the second feature node on the third pathway, and
combine the first pathway and the third pathway to produce a second production representing the logical pathways between the first feature node and the second feature node.

* * * * *

UNITED STATES PATENT AND TRADEMARK OFFICE
CERTIFICATE OF CORRECTION

| | | |
|---|---|---|
| PATENT NO. | : 7,865,454 B2 | |
| APPLICATION NO. | : 11/824018 | |
| DATED | : January 4, 2011 | |
| INVENTOR(S) | : Mark Grechanik | |

It is certified that error appears in the above-identified patent and that said Letters Patent is hereby corrected as shown below:

At column 22, line 30, delete "logical." and insert --logical--.

Signed and Sealed this
Eighth Day of March, 2011

David J. Kappos
*Director of the United States Patent and Trademark Office*